US008464660B2

(12) United States Patent
Valeriano

(10) Patent No.: US 8,464,660 B2
(45) Date of Patent: Jun. 18, 2013

(54) APPARATUS AND METHODS FOR PROVIDING DRINKING WATER AND/OR ENTERTAINMENT FOR PETS

(76) Inventor: Maria Louise Valeriano, St Louis, MO (US)

( * ) Notice: Subject to any disclaimer, the term of this patent is extended or adjusted under 35 U.S.C. 154(b) by 580 days.

(21) Appl. No.: 12/589,249

(22) Filed: Oct. 21, 2009

(65) Prior Publication Data
US 2011/0088628 A1    Apr. 21, 2011

(51) Int. Cl.
*A01K 7/06*    (2006.01)
(52) U.S. Cl.
USPC .............................. 119/72; 119/75
(58) Field of Classification Search
USPC ...................... 119/72, 75, 51.5, 74
See application file for complete search history.

(56) References Cited

U.S. PATENT DOCUMENTS

| | | | |
|---|---|---|---|
| 1,912,530 A | 1/1933 | Kubler | |
| 2,678,630 A | 5/1954 | Fredericksen | |
| 2,790,417 A * | 4/1957 | Brembeck | 119/81 |
| 3,272,181 A * | 9/1966 | Ramsey | 119/76 |
| 4,469,049 A * | 9/1984 | Waynick | 119/76 |
| 4,559,905 A | 12/1985 | Ahrens | |
| 4,779,571 A * | 10/1988 | Row | 119/75 |
| 5,437,244 A | 8/1995 | Van Gilst | |
| 5,456,210 A * | 10/1995 | Miller | 119/75 |
| 5,924,678 A | 7/1999 | Olde | |
| 6,055,934 A * | 5/2000 | Burns et al. | 119/74 |
| 6,101,974 A * | 8/2000 | Frohlich | 119/51.5 |
| 6,148,767 A | 11/2000 | Manchess | |
| 6,237,800 B1 | 5/2001 | Barrett | |
| 6,293,226 B1 * | 9/2001 | Hwang | 119/72 |
| 6,526,916 B1 * | 3/2003 | Perlsweig | 119/74 |
| 6,588,368 B1 | 7/2003 | Cheng | |
| 6,718,912 B2 * | 4/2004 | Pappas | 119/72.5 |
| 6,758,165 B2 * | 7/2004 | Pappas et al. | 119/72.5 |
| 7,051,676 B1 | 5/2006 | Deshaies | |
| 7,117,818 B2 | 10/2006 | Pappas et al. | |
| 7,270,082 B2 * | 9/2007 | Plante | 119/74 |
| 7,367,157 B1 * | 5/2008 | Doan | 47/40.5 |
| 7,430,988 B2 * | 10/2008 | Perlsweig et al. | 119/75 |
| 7,634,973 B1 * | 12/2009 | Cribb et al. | 119/51.5 |
| 8,011,324 B1 * | 9/2011 | Warganich | 119/77 |
| 8,015,943 B1 * | 9/2011 | Samuelson et al. | 119/51.5 |
| 8,104,431 B2 * | 1/2012 | Klenotiz | 119/72 |
| 8,166,917 B2 * | 5/2012 | Welbourne | 119/75 |
| 8,171,885 B1 * | 5/2012 | Northrop et al. | 119/74 |
| 2004/0045510 A1 * | 3/2004 | Duenow | 119/75 |
| 2004/0211366 A1 | 10/2004 | Jarke et al. | |
| 2006/0027179 A1 * | 2/2006 | Welbourne | 119/75 |
| 2010/0043716 A1 * | 2/2010 | Klanke | 119/75 |

OTHER PUBLICATIONS http://www.lapitup.com; copyright 2011; 2 pages; accessed Jul. 19, 2011.

* cited by examiner

*Primary Examiner* — Yvonne Abbott
(74) *Attorney, Agent, or Firm* — Richards Patent Law P.C.

(57) ABSTRACT

Apparatus and methods for providing drinking water and/or entertaining to pets. The apparatus includes a base engaged with a container, a reservoir, and a pump for pumping liquid from the container into the reservoir when the container is upright. The pump may be selectively activated by the animal to pump liquid from the container into the reservoir. A ball may be provided at least partially within the reservoir to rotate relative to the reservoir when licked by the animal to operate the pump and draw liquid from the container, through a fluid conduit, and into the reservoir. Liquid from the reservoir may adhere to an outer surface portion of the ball and thereby become accessible to and drinkable by the animal when the outer surface portion of the ball is rotated from an initial position within the liquid in the reservoir to a second position accessible to the animal's tongue.

28 Claims, 5 Drawing Sheets

APPARATUS AND METHODS FOR PROVIDING DRINKING WATER AND/OR ENTERTAINMENT FOR PETS

FIELD

The present disclosure generally relates to apparatus and methods for providing drinking water and/or entertainment for pets, such as while travelling away from home, riding in a car, and/or in pet carriers.

BACKGROUND

This section provides background information related to the present disclosure which is not necessarily prior art. Many people have animals that accompany them on trips of different lengths. On some of these trips, the pet may have certain needs that must be met, such as thirst.

DRAWINGS

The drawings described herein are for illustrative purposes only of selected embodiments and not all possible implementations, and are not intended to limit the scope of the present disclosure in any way.

Corresponding reference numerals indicate corresponding parts throughout the several views of the drawings.

DETAILED DESCRIPTION

Figure 1:
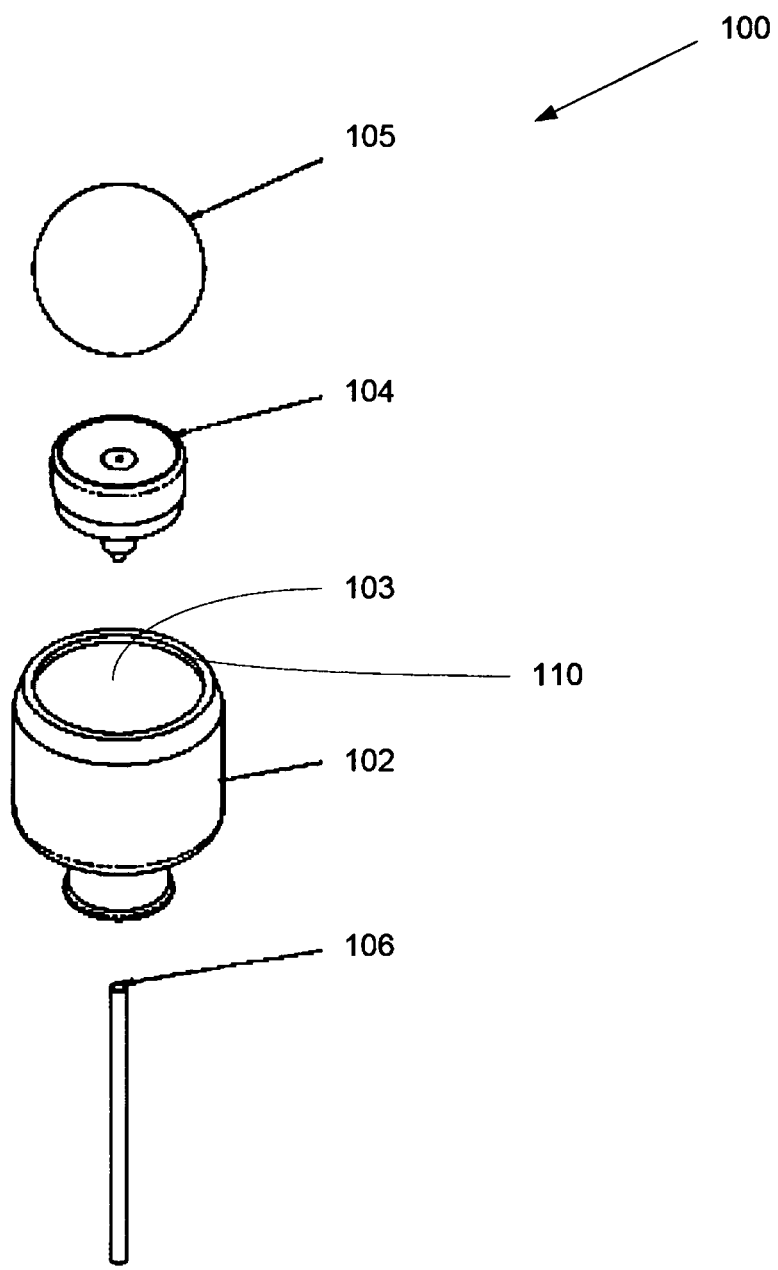
FIG. 1 is an exploded perspective view illustrating components of an exemplary embodiment of an apparatus that may be threadedly attached to a water bottle and then used, for example, to provide drinking water and/or entertainment to a pet.
Figure 2:
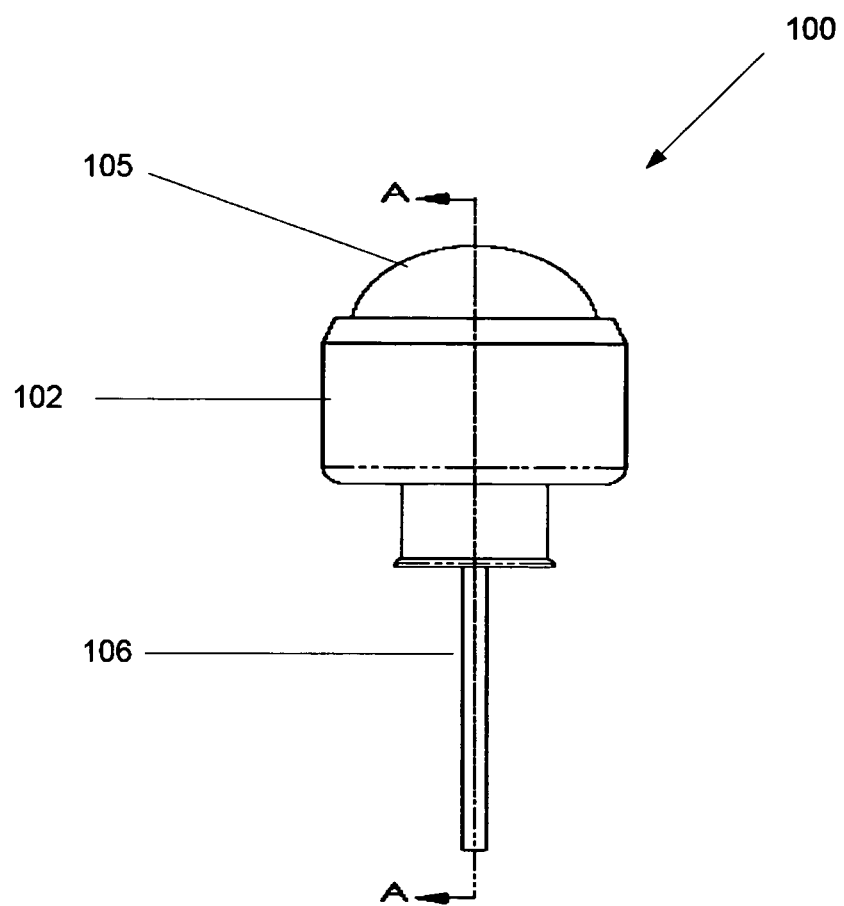
FIG. 2 is a side view of the apparatus shown in FIG. 1 after being assembled.

In the following description, numerous specific details are set forth such as examples of specific components, apparatus, or methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill.

Various disclosed embodiments generally provide an assembly that can be attached to a portable container that sits in an upright position to dispense liquid, where the dispensement means may be selectively activated by an animal. Embodiments may also relate to an apparatus that includes a portable container and an attachment for liquid dispensement by the animal. In various embodiments, liquid may be inhibited from spilling even if the container is upended or tipped over from an upright position. The pump activation means may also provide a source of entertainment to the animal. In addition, the apparatus disclosed herein may also include convenience focused features, such as the ability to be retrofit or attached to standard, commercially available water bottles, which, in turn, may then be conveniently stored in a car cup holder.

Various embodiments are disclosed herein that may be used for providing drinking water and/or entertaining to pets, such as while a pet is travelling away from home, riding in a car, and/or in a pet carrier. In an exemplary embodiment, an apparatus generally includes a base configured for engagement with a container. The apparatus may further include a reservoir and a pump in fluid communication with the reservoir, for pumping liquid from the container into the reservoir when the container is upright and the base is engaged to the container. The apparatus may be configured to allow the pump to be selectively activated by the animal to pump liquid from the container into the reservoir. An elongate fluid conduit may be operatively associated with the pump and be in fluid communication with the reservoir. The elongate fluid conduit may have a sufficient length to extend into a liquid within the container. A rotatable ball may be provided at least partially within the reservoir such that the ball rotates relative to the reservoir when licked by the animal. The ball may apply a downward force against a button operatively associated with the pump to thereby press the button to operate the pump to draw liquid from the container into an open end portion of the fluid conduit, through the fluid conduit, and into the reservoir. Liquid from the reservoir may adhere to an outer surface portion of the ball and thereby become accessible to and drinkable by the animal when the outer surface portion of the ball is rotated from an initial position within the liquid in the reservoir to a second position accessible to the animal's tongue.

Figure 5:
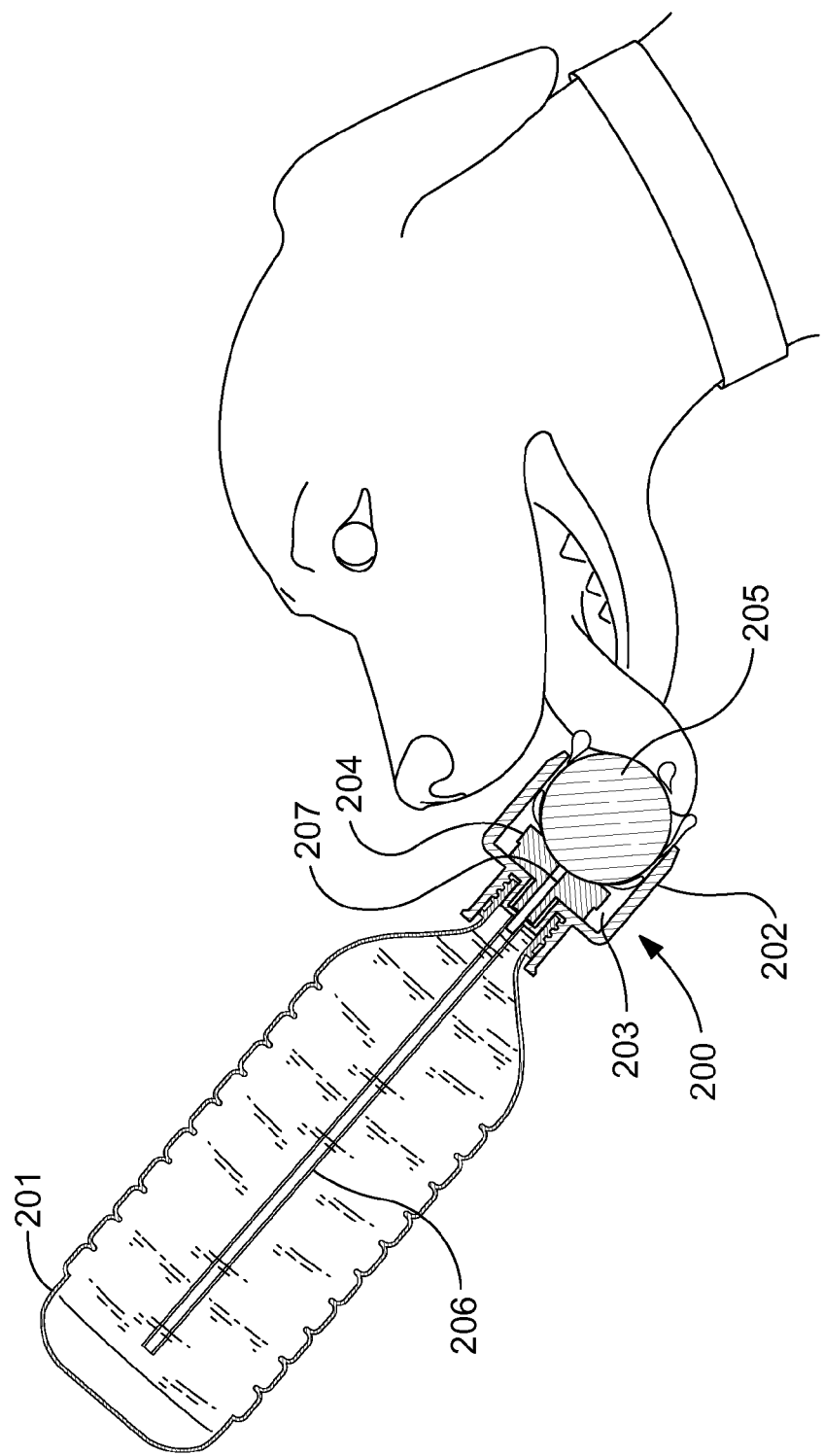
FIG. 5 is an illustration showing an exemplary embodiment of an apparatus attached to a water bottle with a dog licking the ball of the apparatus to obtain drinking water from the water bottle and/or entertainment.

FIGS. 1 through 4 illustrate an exemplary embodiment of an apparatus 100 embodying one or more aspects of the present disclosure. The apparatus 100 may be used, for example, to provide drinking water and/or entertainment to a pet, such as while the pet is travelling away from home, riding in a car, and/or in a pet carrier during a long car ride, airplane ride, bus ride, etc. The apparatus 100 may be attachable to a container (e.g., water bottle 201 (FIG. 5), water bottle 301 (FIG. 6), water bottle 401 (FIG. 7), etc.). The apparatus 100 generally includes a base 102 (e.g., a threaded fitting, etc.) defining a reservoir 103 therein, a pumping mechanism 104, a pump actuator 105 (e.g., a ball, etc.) and a fluid conduit 106 (e.g., tube, straw, etc.), In various embodiments, the apparatus may be configured to be attached or retrofitted onto a standard water bottle commonly available from a variety of stores. As a standard water bottle, the container would have an interior volume for the storage of a liquid and an opening at the top of the container, such as a neck or spout defining an opening surrounded by a male thread of standard pitch and diameter. In various embodiments, the apparatus may also be configured to be attached or retrofitted onto differently configured containers (e.g. water bottles, etc.), such that the same apparatus may be attached to containers of different sizes. By way of example, the apparatus may be configured with a male thread of tapered pitch to accommodate the different diameters of various container sizes. As another example, the base 102 may include at least a portion formed from an elastic material (e.g., rubber, etc.) that is capable of being stretched to fit generally over a neck or spout of a bottle and form a relatively liquid-tight seal therewith.

The container (that the apparatus 100 may be used with) may be manufactured from plastic. But the container may also be polymer, metal, glass, or any other suitable material. In another embodiment, the container may be specially configured for placement inside a pet carrier (e.g., cat or dog carrier, etc.) such as with hooks to attach to a window or door portion of the pet carrier. In yet another embodiment, the container may be sized to fit in a cup holder of an automobile or attach to another object for stability. As with commercially available water bottles, the container may have a male thread at its opening of a known thread pitch and diameter, though other embodiments may replace the male thread with another means of attachment, such as a friction fit, snaps, clips, etc. The container may include a relative flat bottom so as to be able stand upright on a flat surface with no additional support, such that when standing upright the opening is at the top of the container.

In various embodiments, the base 102 may be injection molded from a plastic in the shape of an inverted cup with a thread that corresponds with the pitch and diameter of the thread along the neck or spout of the container to which the base 102 will be attached. In various embodiments, the base 102 may be configured to be attached or retrofitted onto differently configured containers (e.g. water bottles having differently sized necks or spouts, etc.), such that the apparatus 100 may be attached to containers of different sizes. By way of example, the base 102 may include a male thread of tapered pitch to accommodate the different diameters of various container sizes. As another example, the base 102 may include at least a portion formed from an elastic material (e.g., rubber, etc.) that is capable of being stretched to fit generally over a neck or spout of a bottle and form a relatively liquid-tight seal therewith. Alternative materials may also be used for the base 102, such as metal or polymer. In addition, other suitable manufacturing processes may be used for the base 102, such as blow-molding. In addition, other embodiments may use a connection that differs from a threaded connection, such as a friction or interference fit, a rubber portion that is stretched to fit over the neck or spout of a bottle, and/or snaps or clips configured to match a snap or clip on the container. The particular connection means used may also form a liquid-tight seal between the container and the base 102. The base 102 may also have a hole which is generally centered at the top of the base 102. The hole may be configured so as to form a liquid-tight seal with the upper end portion of the fluid conduit 106 that passes through the hole.

In the illustrated embodiment of FIGS. 1 through 4, the reservoir 103 is integrally defined by inner surfaces of the base 102. For example, the reservoir 103 and base 102 may be integrally molded as a single piece. Alternatively, the reservoir 103 may be a separate component that is attached to base 102 in other embodiments. The reservoir 103 may be generally bowl shaped, but can be any shape configurable to hold a liquid. In those embodiments in which the reservoir 103 is a separate, discrete component that is attached to the base 102, the any suitable attachment means may be used, such as an interference or friction fit, one or more snaps or clips, and/or threaded connection. In addition, a compression force between the container or the base 102 and the pumping mechanism 104 may also be used to secure together the reservoir 103 and the base 102. If the reservoir 103 is attached to the base 102, the reservoir 103 may be formed with or without a bottom. If the reservoir 103 is formed without a bottom, the attachment means should form a liquid tight seal, such that a portion of the base 102 may serve as the bottom of the reservoir 103 without leaking between the reservoir 103 and the base 102. In some embodiments, the reservoir 103 may have a lip 110 along its upper edge. This lip 110 may be used to hold in an actuator (e.g., ball 105) for applying force to the pump 104, and can also be used to form a liquid-tight seal with the activation means (e.g. ball 105 in FIGS. 1 through 4) should the apparatus be upended or tipped over from an upright position. When the reservoir 103 is a separate component attached to the base 102, the reservoir 103 may have a hole that aligns with the corresponding hole in the base 102 for receiving an upper end portion of the fluid conduit 106, and this is configured to form a liquid tight seal the fluid conduit 106.

Also shown in FIGS. 1 through 4, the apparatus 100 further includes the fluid conduit 106, which in the illustrated embodiment is a straw or tube. The fluid conduit 106 may have a generally circular cross-section and be formed from plastic. The fluid conduit 106 may be relatively stiff and inflexible in some embodiments. Or, for example, the fluid conduit 106 may also be relative flexible to accommodate for different container heights. In some embodiments, the fluid conduit 106 may be similar to the flexible tubing used with aquarium filters. In other embodiments, the fluid conduit 106 may comprise corrugated or accordion-style flexible tubing or bellows having annular ridges/ribs and grooves that allow the tubing to expand or collapse longitudinally in an accordion fashion, to thereby allow for adjustment of the length of the tubing depending on the height of the container for which the apparatus 100 will be used. Alternative embodiments may include different types of fluid conduits, such as non-plastic straws or tubes with non-circular cross-sections.

With continued reference to FIGS. 1 through 4, the fluid conduit 106 may be attachable to the base 102 in alignment with a hole or fluid passage way 107 in the pump 104. This attachment may be accomplished by various means, such as with a friction or interference fit, one or more hose barbs, threaded connection, etc. The fluid conduit 106 may also extend through the base 102 and reservoir 103 and attach directly to the pumping mechanism 104. The fluid conduit 106 may have a sufficient length to extend also most completely to the bottom of the container so as to increase the accessible amount of liquid that can be drawn from the container by the apparatus 100.

Figure 3:
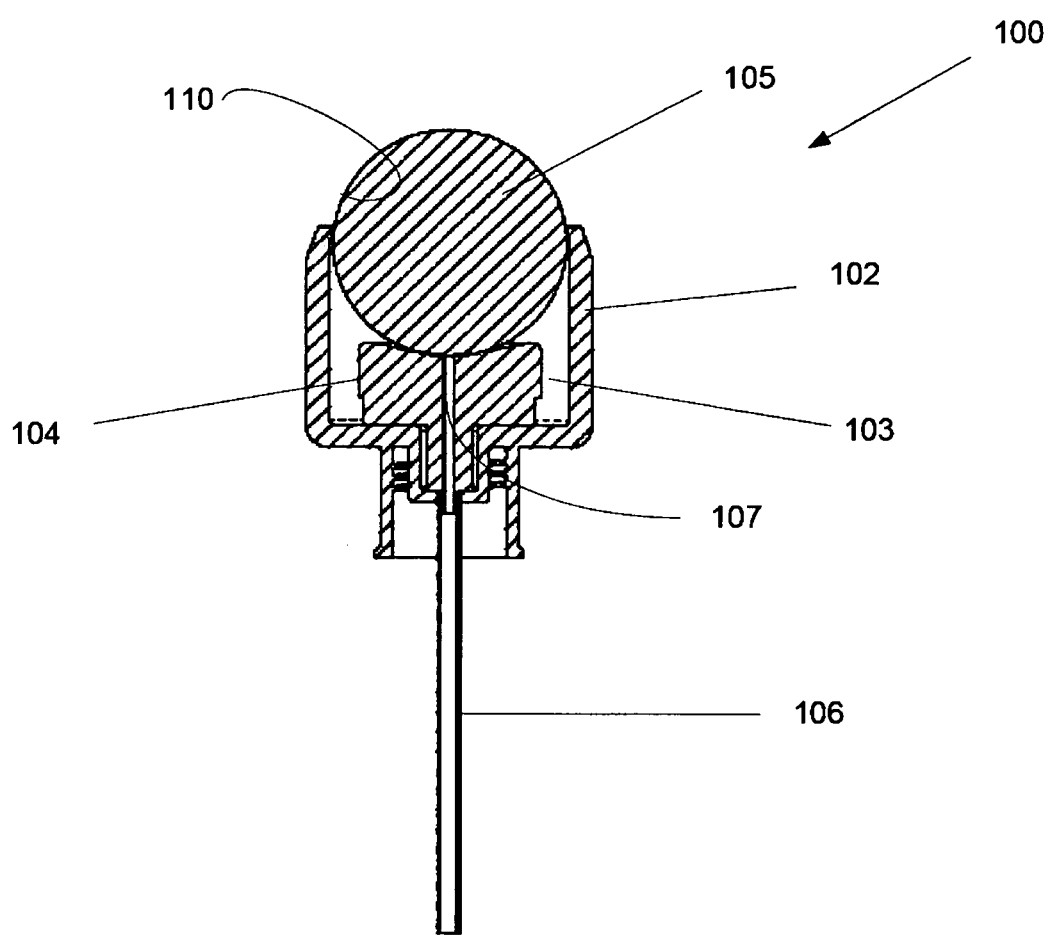
FIG. 3 is a cross-sectional view of the apparatus taken along line A-A in FIG. 2.
Figure 4:
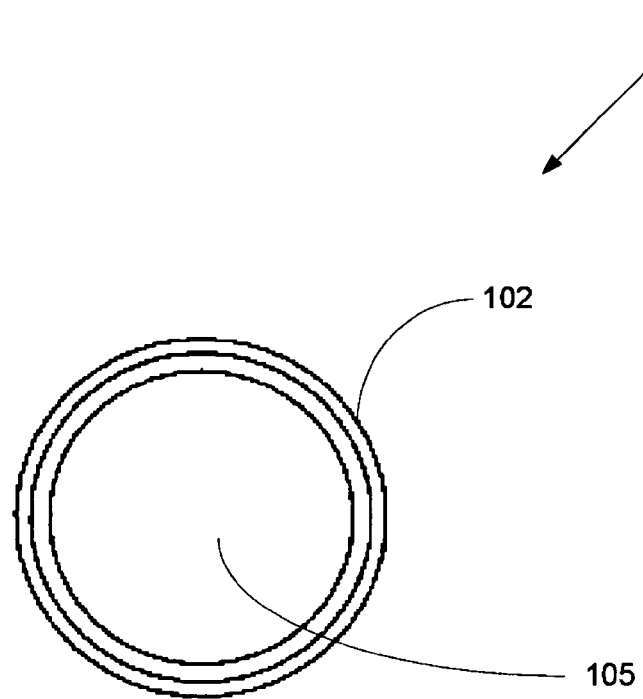
FIG. 4 is a top view of apparatus shown in FIG. 2.

As shown in FIG. 3, the pumping mechanism 104 may be mounted to the base 102 generally within the reservoir 103. A wide range of suitable pumping mechanisms may be used. In various embodiments, the pump 104 may be a push pump of the type found in nail salons. Various embodiments may include a pump 104 that function through the use of a spring (e.g., coil spring, etc.) or other biasing device. The pump 104 may also include a portion or means for activating the pump 104 (e.g., a button or top surface of the pump 104, etc.) and valves. When a sufficient force is applied to the button or other actuation device of the pump 104, the pump's spring or other biasing device may be caused to compress and also reduce the interior volume of the pumping mechanism 104. A first one way valve may stop liquid from being forced down back into the container, so as the volume is decreased the contents of the interior compartment are forced through a second one way valve and out the top onto the pump 104 and into the reservoir 103 or directly into the reservoir 103. Between successive force applications to the button or actuation device of the pump 104, the spring (or other biasing device) returns the interior of the pumping mechanism 104 to a normal volume, creating a low pressure area in the pump's interior. The second one-way valve is returned to a closed position by this low pressure area, and the first one way valve is opened and liquid from the container is drawn into the fluid conduit by virtue of the liquid's higher pressure than the low pressure area of the pump 104. On the next application of force to the pump's button, this cycle is repeated such that liquid in the interior of the pumping mechanism 104 from the pump 104 to the reservoir 103.

The apparatus 100 shown in FIGS. 1 through 4 also includes a rotatable ball 105. Alternative embodiments, however, may include a differently configured device or means for allowing the animal or pet to selectively activate the pump 104, such as a differently shaped actuation device (e.g., cube, etc.).

In the illustrated embodiment of FIGS. 1 through 4, the ball 105 rests on an upper portion or button of the pump 104, such that the ball 105 may apply a force to the button of the pump 104. As an example, when an animal licks the ball 105, the ball 105 rotates and also presses downwardly against the pump's button thereby applying a force for causing the pump 104 to operate. When the ball 105 is used, the outer surface or skin of the ball 105 may be relatively smooth, rough (e.g., with indentations, etc.), and/or be designed to be resilient so as not to take undue damage should the pet chews on the ball and/or continued use by the pet.

In various embodiments, the ball 105 may be configured (e.g., sized, shaped, made of resilient material, etc.) so that a seal is formed between the ball 105 and the lip 110 (FIG. 3) for inhibiting water or other liquid from leaking out of the reservoir 103 should the container to which the apparatus 100 is attached be tipped over or upended. For example, the ball 105 may be sized with a diameter substantially equal to the diameter of the lip 110.

The ball 105 may be sized in relation to the base 102, reservoir 103, and/or pump 104 such that the ball 105 is able to move downwardly from the sealing location (in which the ball 105 forms a seal with the lip 110) to the pump activation location (in which the ball 105 is contacting and applying pressure to the button or portion of the pump 104 to activate the pump 104). In some embodiments, the ball 105 may be spaced apart from the pump 104 when the ball 105 is sealingly engaged with the lip 110, thereby making it more difficult to activate the pumping mechanism 104 when the container is not in an upright position.

In various embodiments, the ball 105 may be provided with features, such as dimples to provide the animal 12 with a more enticing toy and/or also to allow better adherence (e.g., pooling, etc.) of water on the outer surface of the ball 105, thereby improving or increasing the amount of water available to the animal. In various embodiments, the outer surface or skin of the ball 105 may be comprised of a material (e.g., spongy material, etc.) that stay damp and/or retains some amount of water thereon which the animal may then drink by licking the material forming the outer surface of the ball 105.

Accordingly, the ball 105 may thus provide a source of drinking water (or other liquid) to the animal as well as a possible source of entertainment for an animal, which might find it amusing to lick and thus rotate the ball 105, for example, when the animal is travelling away from home, riding in a car, and/or in a pet carrier during a long car ride, airplane ride, bus ride, etc.

In various exemplary embodiments, the apparatus 100 and its components (e.g., ball, pump, base, fluid conduit, etc.) may be dimensionally sized as shown in FIG. 3. In such embodiments, FIG. 3 may thus be referred to as a drawing with a one-to-one scale. In other embodiments, the apparatus and/or any one or more of the components may be dimensionally sized smaller or larger than what is shown in FIG. 3. In these alternative embodiments, FIG. 3 may thus be referred to as a drawing that is not drawn to a one-to-one scale, but may be of a different scale (e.g., drawn to a one-fourth scale, etc.). In addition, other embodiments may include one or more components that have a relative sizing that is smaller or larger relative to the other components than what is shown in FIG. 3. Accordingly, the one-to-one scale shown in FIG. 3 is for purpose of illustration only as other embodiments may include the size of the overall apparatus and/or relative sizing of the components being different, i.e., larger or smaller, than what is in FIG. 3.

Another exemplary embodiment of an apparatus embodying one or more aspects of the present disclosure is attached to a water bottle. A a dog licking the ball 205 of the apparatus may obtain drinking water and/or maybe entertained. The apparatus also generally includes a base, a reservoir, a pumping mechanism, and a fluid conduit.

Another exemplary embodiment of an apparatus 300 embodying one or more aspects of the present disclosure, is attached to a water bottle, which may be used, for example, to provide drinking water and/or entertainment to a pet such as while the pet is travelling away from home, riding in a car, and/or in a pet carrier during a long car ride, airplane ride, bus ride, etc. The apparatus may be attached to the water bottle in a cup holder of an automobile. The apparatus may be removed from the water bottle. In addition, after removal of the ball from the base and reservoir the pump may be seen. The apparatus may be held by a human hand and presented to a dog.

In some embodiments, a lever or other device to facilitate disassembly (e.g., removal of the ball, etc.) of one or more components of apparatus, for example, to allow for easier and/or better cleaning and sanitation of the apparatus and its components. By way of example, a lever may be provided that when pressed down by a user dislodges the ball from the base and reservoir, thereby allowing the ball to be more readily removed from the apparatus.

In some embodiments, a powder, liquid substance, or other additive may be provided along with an apparatus (e.g., 100, etc.). The additive may be configured and designed to be mixed into the water (or other liquid) within the container before attaching the apparatus to the container. The additive may be configured to enhance the taste or appeal (e.g., flavor additive, etc.) of the liquid within the container to the animal, for example, to encourage the animal to lick the ball when the apparatus is first presented to the animal for use. Or, for example, the additive may alternatively or additionally be configured to enhance the nutritional value or other health aspect of the liquid for the animal, such as by providing vitamins, nutrients, etc. As a further example, the additive may alternatively or additionally be configured to provide medicine or have a medicinal purpose for the animal, especially for those animals that are reluctant or resist taking medicine in the form of pills. An additional example may include an additive that may alternatively or additionally be configured to have a calming or sedative like effect on the animal and/or reduce motion travel sickness for the animal, which may be especially useful for a pet while traveling in a pet carrier on a long car ride.

Various embodiments of the present disclosure have been described as being used with disposable, commercially available, existing, and/or plastic water bottles having threaded spouts or necks. It should be understood that embodiments and aspects of the present disclosure may be used with a wide range of not only water bottles, but also a wide range of other container sizes and container types besides water bottles having threaded spouts or necks. For example, embodiments and aspects of the present disclosure should not be limited to use with any particular size of container (e.g., half liter, one liter, sixteen ounces, one quart, etc.), with containers having a particular neck size, such as diameter, length (e.g., neck length of 0.844 inches, neck length of 0.70 inches, etc.), or with containers having any particular thread structure, such as thread length, pitch (e.g., a pitch of 0.104 inches, a pitch of 0.96 inches, a pitch of 0.70 inches, or length (e.g., pitch,), etc. In addition, some embodiments may already include a container such that there would not be any attachment or retrofitting onto an existing water bottle. Accordingly, the scope of the present disclosure should not be limited to any specific form/type of container.

In addition, the scope of the present disclosure should not be limited to any particular animal or pet, as embodiments and aspects of the present disclosure may be used with a wide range of animals, such as dogs (e.g., Chihuahua, Great Dane, German Shepherd, Collie, Poodle, Beagle, etc.), cats, other pets, animals at a zoo (e.g., tiger, camel, etc.), etc. In embodiments that are used with relatively large animals (e.g., zoo animals, etc.), the apparatus may be sized substantially larger than an apparatus intended to be provided to a Chihuahua or other small animal.

Further, the scope of the present disclosure should not be limited to use to any particular environment, as embodiments and aspects of the present disclosure may be used in a wide range of environments, such as pet carriers, in an home, in an mobile platform (e.g., car, van, truck, etc.), at the park, on the sidewalk, etc.

Numerical dimensions and values are provided herein for illustrative purposes only. The particular dimensions and values provided are not intended to limit the scope of the present disclosure.

Terms such as "upper," "lower," "inner," "outer," "inwardly," "outwardly," and the like when used herein refer to positions of the respective elements as they are shown in the accompanying drawings, and the disclosure is not necessarily limited to such positions. Terms such as "first," "second," and other numerical terms when used herein do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments of the present invention has been provided for purposes of illustration and description. It is not intended to be exhaustive or to limit the invention to the precise forms disclosed. Individual elements or features of a particular embodiment are generally not limited to that particular embodiment, but, where applicable, are interchangeable and can be used in a selected embodiment, even if not specifically shown or described.

What is claimed is:

1. An apparatus suitable for providing a liquid to and/or for entertaining an animal, the apparatus comprising:
   a base configured for engagement with a container;
   a reservoir; and
   a pump in fluid communication with the reservoir, for pumping liquid from the container into the reservoir when the container is upright and the base is engaged to the container,
   wherein the apparatus is configured to allow the pump to be selectively activated by the animal to pump liquid from the container into the reservoir, wherein the pump is operatively associated with a button that when pressed causes the pump to operate for pumping liquid from the container into the reservoir.

2. An apparatus suitable for providing a liquid to and/or for entertaining an animal, the apparatus comprising:
   a base configured for engagement with a container;
   a reservoir; and
   a pump in fluid communication with the reservoir, for pumping liquid from the container into the reservoir when the container is upright and the base is engaged to the container,
   wherein the apparatus is configured to allow the pump to be selectively activated by the animal to pump liquid from the container into the reservoir, further comprising an elongate fluid conduit operatively associated with the pump and in fluid communication with the reservoir, the elongate fluid conduit having a sufficient length to extend into a liquid within the container, whereby the pump is operable for drawing liquid from within the container into an open end portion of the elongate fluid conduit, through the elongate fluid conduit, and into the reservoir.

3. The apparatus of claim 2, wherein the elongate fluid conduit comprises a tube or a straw.

4. An apparatus suitable for providing a liquid to and/or for entertaining an animal, the apparatus comprising:
   a base configured for engagement with a container;
   a reservoir; and
   a pump in fluid communication with the reservoir, for pumping liquid from the container into the reservoir when the container is upright and the base is engaged to the container,
   wherein the apparatus is configured to allow the pump to be selectively activated by the animal to pump liquid from the container into the reservoir, wherein the base includes a threaded portion that is threadably engagable to a threaded portion of the container, wherein the threaded portion of the base is configured for threaded engagement with a threaded spout or neck of a water bottle.

5. An apparatus suitable for providing a liquid to and/or for entertaining an animal, the apparatus comprising:
   a base configured for engagement with a container;
   a reservoir; and
   a pump in fluid communication with the reservoir, for pumping liquid from the container into the reservoir when the container is upright and the base is engaged to the container,
   wherein the apparatus is configured to allow the pump to be selectively activated by the animal to pump liquid from the container into the reservoir, wherein the base includes a threaded portion that is threadably engagable to a threaded portion of the container, wherein the threaded portion of the base is configured for threaded engagement with a threaded spout or neck of a commercially available water bottle from which a threaded cap has been removed.

6. An apparatus suitable for providing a liquid to and/or for entertaining an animal, the apparatus comprising:
   a base configured for engagement with a container;
   a reservoir; and
   a pump in fluid communication with the reservoir, for pumping liquid from the container into the reservoir when the container is upright and the base is engaged to the container, wherein the apparatus is configured to allow the pump to be selectively activated by the animal to pump liquid from the container into the reservoir, wherein the base includes a threaded portion that is threadably engagable to a threaded portion of the container, wherein the threaded portion of the base is configured for threaded engagement with a threaded spout or neck of a plastic water bottle from which a threaded cap has been removed.

7. An apparatus suitable for providing a liquid to and/or for entertaining an animal, the apparatus comprising:
a base configured for engagement with a container;
a reservoir; and
a pump in fluid communication with the reservoir, for pumping liquid from the container into the reservoir when the container is upright and the base is engaged to the container,
wherein the apparatus is configured to allow the pump to be selectively activated by the animal to pump liquid from the container into the reservoir, further comprising a ball within the reservoir, whereby a force applied to the ball for rotating the ball relative to the reservoir causes the ball to apply a downward force against a button operatively associated with the pump to thereby press the button to operate the pump to draw liquid from the container into the reservoir.

8. The apparatus of claim 7, wherein the ball is configured to form a friction fit with one or more sidewalls of the reservoir, thereby inhibiting the ball from inadvertently dislodging from the reservoir.

9. The apparatus of claim 7, wherein the ball is configured to form a seal generally between the ball and one or more sidewalls of the reservoir, thereby inhibiting leakage of liquid from the reservoir if the container is upended.

10. The apparatus of claim 7, wherein at least a portion of the ball is accessible to the animal such that the animal may lick the ball thereby applying the force for rotating the ball and for applying a downward force against the button.

11. The apparatus of claim 7, wherein the ball is rotatably mounted within the reservoir such that the ball rotates relative to the reservoir when licked by the animal, whereby liquid from the reservoir adheres to an outer surface portion of the ball and becomes accessible to the animal when the outer surface portion of the ball is rotated from an initial position within the liquid within the reservoir to a second position accessible to the animal's tongue.

12. An apparatus suitable for providing a liquid to and/or for entertaining an animal, the apparatus comprising:
a base configured for engagement with a container;
a reservoir; and
a pump in fluid communication with the reservoir, for pumping liquid from the container into the reservoir when the container is upright and the base is engaged to the container,
wherein the apparatus is configured to allow the pump to be selectively activated by the animal to pump liquid from the container into the reservoir, further comprising a movable member within the reservoir and configured for applying a downward force against a button operatively associated with the pump to thereby press the button to operate the pump to draw liquid from the container into the reservoir.

13. The apparatus of claim 12, wherein at least a portion of the movable member is accessible to the animal such that the animal may lick the movable member thereby causing the movable member to apply a downward force against the button for pressing the button and operate the pump.

14. An apparatus suitable for providing a liquid to and/or for entertaining an animal, the apparatus comprising:
a base configured for engagement with a container;
a reservoir; and
a pump in fluid communication with the reservoir, for pumping liquid from the container into the reservoir when the container is upright and the base is engaged to the container,
wherein the apparatus is configured to allow the pump to be selectively activated by the animal to pump liquid from the container into the reservoir, wherein the apparatus is attached to a container configured to be positioned in an upright position within a cup holder of an automobile.

15. An apparatus suitable for providing a liquid to and/or for entertaining an animal, the apparatus comprising:
a base configured for engagement with a container;
a reservoir; and
a pump in fluid communication with the reservoir, for pumping liquid from the container into the reservoir when the container is upright and the base is engaged to the container,
wherein the apparatus is configured to allow the pump to be selectively activated by the animal to pump liquid from the container into the reservoir, wherein the pump is a push pump.

16. An apparatus suitable for providing a liquid to and/or for entertaining an animal, the apparatus comprising:
a base configured for engagement with a container;
a reservoir; and
a pump in fluid communication with the reservoir, for pumping liquid from the container into the reservoir when the container is upright and the base is engaged to the container,
wherein the apparatus is configured to allow the pump to be selectively activated by the animal to pump liquid from the container into the reservoir, where the container is a standard water bottle.

17. A system including a water bottle having an apparatus suitable for providing a liquid to and/or for entertaining an animal attached thereto, the apparatus comprising:
a base configured for engagement with a container;
a reservoir; and
a pump in fluid communication with the reservoir, for pumping liquid from the container into the reservoir when the container is upright and the base is engaged to the container,
wherein the apparatus is configured to allow the pump to be selectively activated by the animal to pump liquid from the container into the reservoir.

18. A method of providing a liquid to an animal and/or for entertaining an animal, the method comprising attaching an apparatus to a container including a liquid suitable for drinking by the animal, the apparatus including a pump and a reservoir that are in fluid communication with the container when the apparatus is attached to the container such that the pump is operable for pumping liquid from the container to the reservoir, wherein the apparatus is configured to enable the animal to selectively operate the pump to draw liquid from the container into the reservoir, and wherein the method includes allowing the animal to selectively operate the pump, wherein the apparatus includes a straw or tube operatively associated with the pump, and wherein the method includes feeding the straw or tube through an opening of the container such that an open end portion of the straw or tube is in the liquid within the container.

19. A method of providing a liquid to an animal and/or for entertaining an animal, the method comprising attaching an apparatus to a container including a liquid suitable for drinking by the animal, the apparatus including a pump and a reservoir that are in fluid communication with the container when the apparatus is attached to the container such that the pump is operable for pumping liquid from the container to the reservoir, wherein the apparatus is configured to enable the animal to selectively operate the pump to draw liquid from the container into the reservoir, and wherein the method includes allowing the animal to selectively operate the pump, wherein attaching the apparatus to the container including threadably attaching the apparatus to a threaded portion of the container, wherein the container includes a threaded spout or neck, and wherein threadably attaching comprises threadably engaging a threaded portion of the apparatus to the threaded spout or neck of the container, wherein the container comprises a bottle with water therein.

20. The method of claim 19, wherein the method includes opening the bottle by unscrewing and removing a cap from the threaded spout or neck of the bottle, and then threadably engaging a threaded portion of the apparatus to the threaded spout or neck of the bottle from which the cap was removed.

21. The claim 20, wherein the bottle comprises a commercially available water bottle.

22. The claim 21, wherein the bottle container comprises a plastic water bottle.

23. A method of providing a liquid to an animal and/or for entertaining an animal, the method comprising attaching an apparatus to a container including a liquid suitable for drinking by the animal, the apparatus including a pump and a reservoir that are in fluid communication with the container when the apparatus is attached to the container such that the pump is operable for pumping liquid from the container to the reservoir, wherein the apparatus is configured to enable the animal to selectively operate the pump to draw liquid from the container into the reservoir, and wherein the method includes allowing the animal to selectively operate the pump, wherein attaching the apparatus to the container including threadably attaching the apparatus to a threaded portion of the container, wherein the container includes a threaded spout or neck, and wherein threadably attaching comprises threadably engaging a threaded portion of the apparatus to the threaded spout or neck of the container, wherein the apparatus includes an elongate fluid conduit operatively associated with the pump and in fluid communication with the reservoir, and wherein the method includes feeding the fluid conduit through an opening of the threaded spout or neck such that an open end portion of the fluid conduit is in the liquid within the container.

24. A method of providing a liquid to an animal and/or for entertaining an animal, the method comprising attaching an apparatus to a container including a liquid suitable for drinking by the animal, the apparatus including a pump and a reservoir that are in fluid communication with the container when the apparatus is attached to the container such that the pump is operable for pumping liquid from the container to the reservoir, wherein:

the apparatus includes a rotatable ball within the reservoir such that the ball rotates relative to the reservoir when licked by the animal, such that the ball applies a downward force against a button operatively associated with the pump to thereby press the button to operate the pump to draw liquid from the container into an open end portion of the fluid conduit, through the fluid conduit, and into the reservoir, and such that liquid from the reservoir adheres to an outer surface portion of the ball and becomes accessible to the animal when the outer surface portion of the ball is rotated from an initial position within the liquid in the reservoir to a second position accessible to the animal's tongue; and the method includes allowing the animal to lick the ball.

25. A method of providing a liquid to an animal and/or for entertaining an animal, the method comprising attaching an apparatus to a container including a liquid suitable for drinking by the animal, the apparatus including a pump and a reservoir that are in fluid communication with the container when the apparatus is attached to the container such that the pump is operable for pumping liquid from the container to the reservoir, further comprising positioning the container upright within a pet carrier after attaching the apparatus to the container, whereby the upright container may provide drinking water and/or entertainment to an animal within the pet carrier.

26. A method of providing a liquid to an animal and/or for entertaining an animal, the method comprising attaching an apparatus to a container including a liquid suitable for drinking by the animal, the apparatus including a pump and a reservoir that are in fluid communication with the container when the apparatus is attached to the container such that the pump is operable for pumping liquid from the container to the reservoir, further comprising storing the container in an upright position within a cup holder of an automobile after attaching the apparatus to the container.

27. A method of providing a liquid to an animal and/or for entertaining an animal, the method comprising attaching an apparatus to a container including a liquid suitable for drinking by the animal, the apparatus including a pump and a reservoir that are in fluid communication with the container when the apparatus is attached to the container such that the pump is operable for pumping liquid from the container to the reservoir, further comprising adding one or more additives, powders, and/or substances to the liquid before attaching the apparatus to the container.

28. The method of claim 27, wherein the liquid is water, and wherein adding one or more additives, powders, and/or substances to the water includes at least one or more of:

flavor additive for enhancing the taste or appeal of the water to the animal;

additive for enhancing the nutritional value or other health aspects of the water for the animal;

medicine;

additive for calming or sedating; and/or additive for reducing motion travel sickness for the animal.

* * * * *